United States Patent
Morisaki

(10) Patent No.: US 8,910,467 B2
(45) Date of Patent: Dec. 16, 2014

(54) HYBRID VEHICLE CONTROL DEVICE AND HYBRID VEHICLE

(71) Applicant: Keisuke Morisaki, Toyota (JP)

(72) Inventor: Keisuke Morisaki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/154,565

(22) Filed: Jan. 14, 2014

(65) Prior Publication Data

US 2014/0196445 A1 Jul. 17, 2014

(30) Foreign Application Priority Data

Jan. 17, 2013 (JP) ................................. 2013-005995

(51) Int. Cl.
*F01N 3/00* (2006.01)
*F01N 3/08* (2006.01)

(52) U.S. Cl.
CPC ........................................ *F01N 3/08* (2013.01)
USPC ................... 60/285; 60/280; 60/286; 60/299; 180/65.21; 180/65.31; 180/309

(58) Field of Classification Search
USPC ........ 60/280, 284, 285, 286; 180/65.1, 65.21, 180/65.31, 309, 69.3
See application file for complete search history.

(56) References Cited

U.S. PATENT DOCUMENTS

| | | | | |
|---|---|---|---|---|
| 5,327,991 A * | 7/1994 | Yoshida | ................... | 180/65.245 |
| 5,588,498 A | 12/1996 | Kitada | | |
| 6,389,807 B1 * | 5/2002 | Suzuki et al. | ................... | 60/285 |
| 7,059,116 B2 * | 6/2006 | Kusada et al. | ................... | 60/285 |
| 8,209,968 B2 * | 7/2012 | Miyashita et al. | .............. | 60/301 |
| 8,256,546 B2 * | 9/2012 | Ando | ........................ | 180/65.21 |
| 2004/0237510 A1 | 12/2004 | Kusada et al. | | |

FOREIGN PATENT DOCUMENTS

| | | |
|---|---|---|
| JP | 3000804 B2 | 11/1999 |
| JP | 2005-009474 A | 1/2005 |
| JP | 2006-070820 A | 3/2006 |

* cited by examiner

*Primary Examiner* — Binh Q Tran
(74) *Attorney, Agent, or Firm* — Sughrue Mion, PLLC

(57) ABSTRACT

In controlling a hybrid vehicle, an internal combustion engine and an electric motor are controlled such that, when a power request is received while traveling with an operation of the internal combustion engine stopped and a requested power required for traveling is higher than a predetermined power, the operation of the internal combustion engine is started with an intake air volume based on the requested power and the hybrid vehicle travels with the requested power. When the power request is received for the first time after ignition-on, the start control for controlling the internal combustion engine is performed such that the operation of the internal combustion engine is started with an intake air volume lower than that based on the requested power. The hybrid vehicle includes a controller that performs the above control, an internal combustion engine, an electric motor, a battery, and a purification device.

6 Claims, 6 Drawing Sheets

HYBRID VEHICLE CONTROL DEVICE AND HYBRID VEHICLE

INCORPORATION BY REFERENCE

The disclosure of Japanese Patent Application No. 2013-005995 filed on Jan. 17, 2013 including the specification, drawings and abstract is incorporated herein by reference in its entirety.

BACKGROUND OF THE INVENTION

1. Field of the Invention

The present invention relates to a hybrid vehicle control device (i.e., a control device for controlling a hybrid vehicle) and a hybrid vehicle. More particularly, the present invention relates to a hybrid vehicle control device that controls a hybrid vehicle and to a hybrid vehicle that includes such a control device, wherein the hybrid vehicle includes an internal combustion engine, which has in its exhaust system a purification device with a purification catalyst for purifying the exhaust gas and is capable of outputting a motive power for traveling, an electric motor that can receive and output a motive power for traveling, and a battery that can send and receive an electric power to and from the electric motor.

2. Description of Related Art

A hybrid vehicle control device of this type has been proposed for use in a hybrid vehicle that includes a gasoline engine and a motor, wherein the gasoline engine includes a catalyst converter in its exhaust gas passage for purifying the exhaust gas (such as hydrocarbon) through catalytic action. This hybrid vehicle control device controls the engine in such a manner that the throttle valve opening is decreased for a predetermined time after the gasoline engine is started (for example, see Japanese Patent Application Publication No. 2005-9474 (JP 2005-9474 A)). By controlling the engine in this manner, the hybrid vehicle control device reduces the flow rate of air to be supplied to the engine so that the amount of hydrocarbon emission can be reduced.

SUMMARY OF THE INVENTION

The hybrid vehicle control device (i.e., the control device for controlling a hybrid vehicle) disclosed in Japanese Patent Application Publication No. 2005-9474 (JP 2005-9474 A) decreases the throttle valve opening for a predetermined time after the gasoline engine is started. This sometimes prevents the gasoline engine from quickly outputting a requested output requested by a driver. To output a requested output quickly, it is possible to make the throttle valve opening correspond to the accelerator pedal opening. However, when the catalyst of the catalyst converter is not activated, the emission included in the exhaust gas becomes worse.

A control device for controlling a hybrid vehicle and a hybrid vehicle according to the present invention output a requested power required for traveling and, at the same time, prevent the emission from becoming worse.

A first aspect of the present invention relates to a control device that controls a hybrid vehicle. The hybrid vehicle includes an internal combustion engine in which a purification device having a purification catalyst for purifying an exhaust is installed in an exhaust system and which outputs a motive power for traveling; an electric motor that receives and outputs a motive power for traveling; and a battery that sends and receives an electric power to and from the electric motor. The control device includes a control apparatus. The control device controls the internal combustion engine and the electric motor in such a way that, when a power request is received while traveling with an operation of the internal combustion engine stopped and a requested power required for traveling is higher than a predetermined power, the operation of the internal combustion engine is started with an intake air volume based on the requested power and, in addition, the hybrid vehicle travels with the requested power. The control apparatus preforms a start control for controlling the internal combustion engine in such a way that, when the power request is received for the first time after an ignition switch is turned on, the operation of the internal combustion engine is started with an intake air volume lower than the intake air volume based on the requested power.

The control device according to the first aspect of the present invention controls the internal combustion engine and the electric motor in such a way that, when a power request is received while traveling with an operation of the internal combustion engine stopped and a requested power required for traveling is higher than a predetermined power, the operation of the internal combustion engine is started with an intake air volume based on the requested power and, in addition, the hybrid vehicle travels with the requested power. This control allows the hybrid vehicle to travel with the requested power when a power request is received. The control device preforms a start control (low air volume start control) for controlling the internal combustion engine in such a way that, when the power request is received for the first time after an ignition switch is turned on, the operation of the internal combustion engine is started with an intake air volume lower than the intake air volume based on the requested power. Immediately after the ignition switch is turned on, it is considered that the temperature of the purification catalyst in the internal combustion engine is too low to be activated. Therefore, when the power request is issued for the first time after the ignition switch is turned on, the control device performs the start control, in which the internal combustion engine is controlled in such a way that the operation of the internal combustion engine is started with an intake air volume lower than the intake air volume based on the requested power, thus preventing the emission from becoming worse. Thus, the control device outputs the requested power and, at the same time, prevents the emission from becoming worse.

In the control device described above, the control apparatus may perform the start control when the power request, issued for the first time after the ignition switch is turned on, is received and the purification catalyst is not activated. When the power request, issued for the first time after the ignition switch is turned on, is received and the purification catalyst is not activated, it is assumed that the emission will become worse. In such a case, performing the start control with the low air volume as described above prevents the emission from becoming worse.

In the control device described above, the control apparatus may determine that the purification catalyst is not activated when a temperature of the purification catalyst is lower than a predetermined temperature.

In the control device described above, the control apparatus may control the internal combustion engine in such a way that, in the start control, the internal combustion engine is started with an intake air volume predetermined for an idle operation of the internal combustion engine.

A second aspect of the present invention relates to a hybrid vehicle. The hybrid vehicle includes an internal combustion engine, a first electric motor, a battery, a purification device, and a control apparatus. The internal combustion engine outputs a motive power for traveling. The first electric motor receives and outputs a motive power for traveling. The battery sends and receives an electric power to and from the first electric motor. The purification device has a purification catalyst for purifying an exhaust and is installed in the exhaust system of the internal combustion engine. The control apparatus controls the internal combustion engine and the first electric motor in such a way that, when a power request is received while traveling with an operation of the internal combustion engine stopped and a requested power required for traveling is higher than a predetermined power, the operation of the internal combustion engine is started with an intake air volume based on the requested power and, in addition, the hybrid vehicle travels with the requested power. The control apparatus preforms a start control for controlling the internal combustion engine in such a way that, when the power request is received for the first time after an ignition switch is turned on, the operation of the internal combustion engine is started with an intake air volume lower than the intake air volume based on the requested power.

The hybrid vehicle according to the second aspect of the present invention includes the control apparatus corresponding to the control device (control apparatus) in the first aspect of the present invention and, therefore, achieves the effect similar to that achieved by the control device of the hybrid vehicle in the first aspect of the present invention. For example, the hybrid vehicle in the second aspect of the present invention outputs a requested power and, at the same time, prevents the emission from becoming worse.

The hybrid vehicle described above may further includes a planetary gear and a second electric motor. The planetary gear may include three rotating components. The three rotating components may be connected respectively to a driving shaft linked to an axle, an output axis of the internal combustion engine, and a rotation axis of the first electric motor. The second electric motor may include a rotation axis. The rotation axis of the second electric motor may be connected to the driving shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, a mode for carrying out the present invention is described using an exemplary embodiment.

Figure 1:
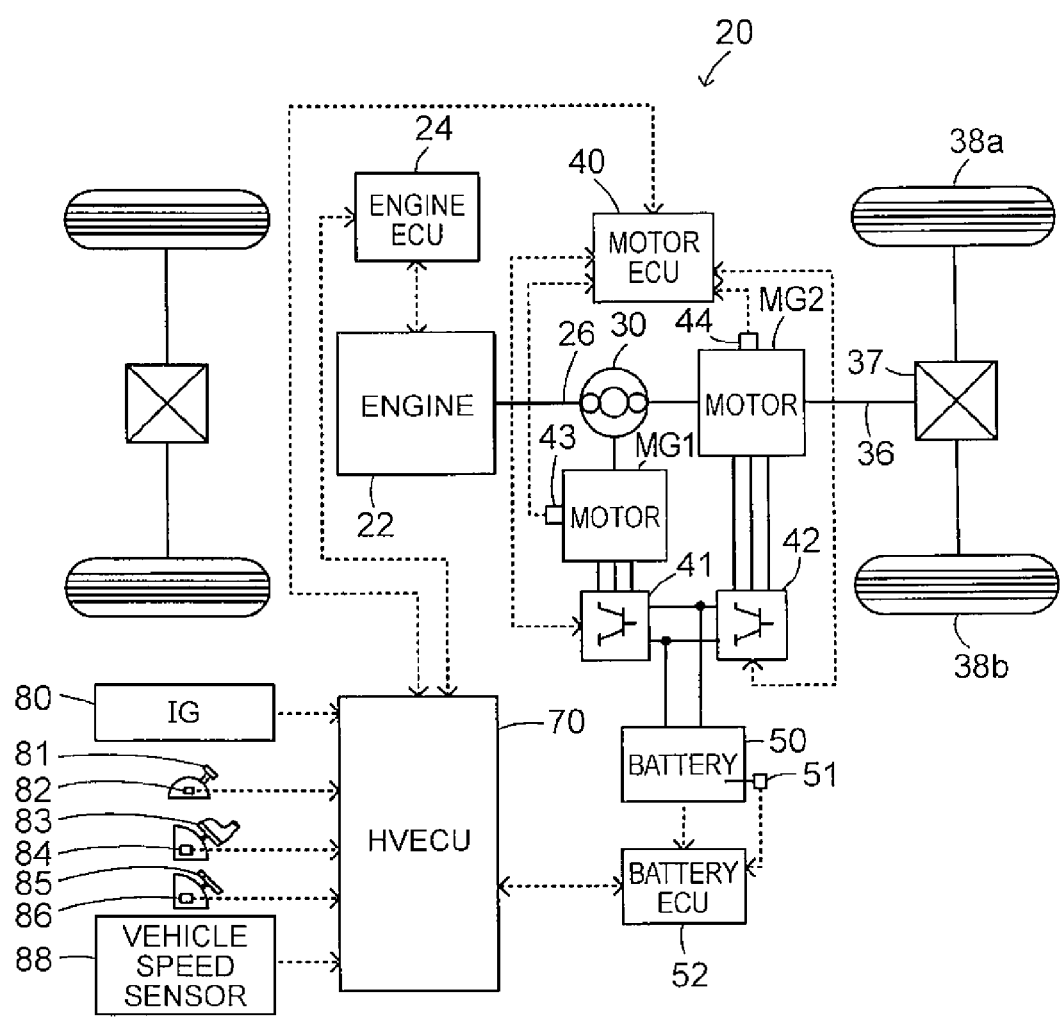
FIG. 1 is a configuration diagram showing the general configuration of a hybrid car 20 in one exemplary embodiment of the present invention.

FIG. 1 is a configuration diagram showing the general configuration of a hybrid car 20 in one exemplary embodiment of the present invention. As shown in the figure, the hybrid car 20 in the exemplary embodiment includes: an engine 22 that uses gasoline or gas oil as the fuel; an engine electronic control unit (hereinafter called an engine ECU) 24 that drives and controls the engine 22; a planetary gear 30 the carrier of which is connected to a crank shaft 26 of the engine 22 and the ring gear of which is connected to a driving shaft 36 linked to driving wheels 38a and 38b via a differential gear 37; a motor MG1 which is configured as a synchronous generator motor and the rotor of which is connected to the sun gear of the planetary gear 30; a motor MG2 which is configured as a synchronous generator motor and the rotor of which is connected to the driving shaft 36; inverters 41 and 42 that drive the motors MG1 and MG2 respectively, a motor electronic control unit (hereinafter called a motor ECU) 40 that drives and controls the motors MG1 and MG2; a battery 50 that sends and receives an electric power to and from the motors MG1 and MG2 via the inverters 41 and 42 respectively; a battery electronic control unit (hereinafter called a battery ECU) 52 that manages the battery 50; and a hybrid electronic control unit (hereinafter called an HV ECU) 70 that controls the whole vehicle.

Figure 2:
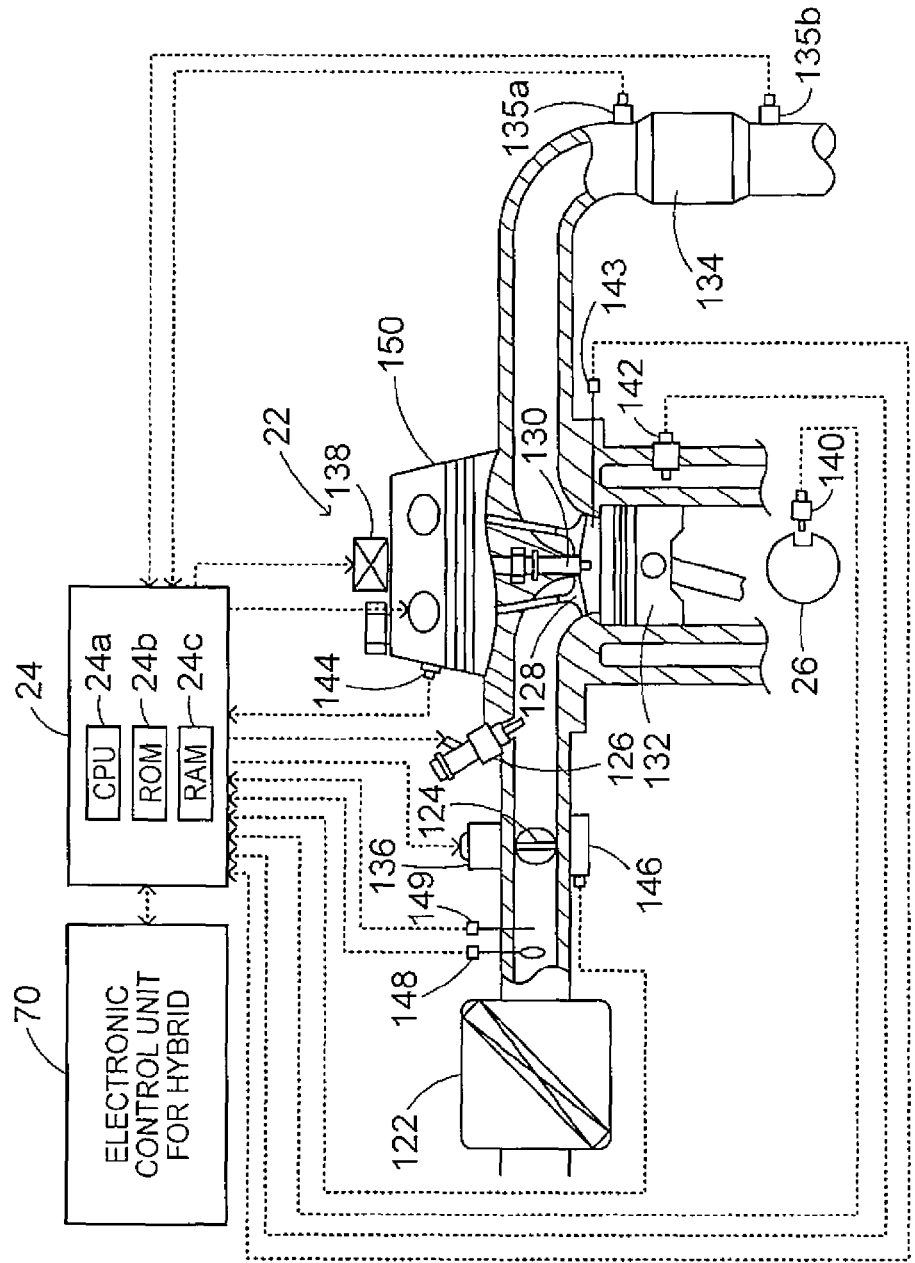
FIG. 2 is a configuration diagram showing the general configuration of an engine 22.

As shown in FIG. 2, the engine 22 takes in air, cleaned by the an air cleaner 122, via a throttle valve 124 and, at the same time, injects gasoline from a fuel injection valve 126 to mix the taken-in air and the gasoline. The engine 22 takes in the fuel-air mixture into the combustion chamber via an intake valve 128 and causes it to burn explosively by an electric spark of a spark plug 130. The energy generated in this way pushes a piston 132 to the bottom of the cylinder to convert the reciprocating motion into the rotating motion of the crank shaft 26. The exhaust from the engine 22 is discharged into the air via a purification device 134 that has a purification catalyst (three-way catalyst) for purifying harmful emissions such as carbon monoxide (CO), hydrocarbon (HC), and nitrogen oxide (NOx). The engine ECU 24 is configured as a microprocessor with a CPU 24a as its main component. In addition to the CPU 24a, the engine ECU 24 includes a ROM 24b that stores processing programs, a RAM 24c that temporarily stores data, and an input/output port and a communication port not shown. The engine ECU 24 receives signals from various sensors, which detect the state of the engine 22, via the input port. They include the following: the crank position from a crank position sensor 140 that detects the rotation position of the crank shaft 26; the cooling water temperature from a water temperature sensor 142 that detects the temperature of the cooling water of the engine 22; the cylinder internal pressure Pin from a pressure sensor 143 that is installed in the combustion chamber; the cam position from a cam position sensor 144 that detects the rotation position of the cam shaft that opens and closes an intake valve 128 and an exhaust valve provided for the intake and exhaust of air to and from the combustion chamber; the throttle position from a throttle valve position sensor 146 that detects the position of the throttle valve 124; the intake air volume Qa from an air flow meter 148 installed on the intake pipe; the intake air temperature Ta from a temperature sensor 149 installed also on the same intake pipe; the air-fuel ratio AF from an air-fuel ratio sensor 135a; and the oxygen signal from an oxygen sensor 135b. On the other hand, the engine ECU 24 outputs various control signals, which drive the engine 22, via the output port. They include the following: the drive signal to the fuel injection valve 126; the drive signal to a throttle motor 136 that adjusts the position of the throttle valve 124; the control signal to an ignition coil 138 that is integrated with an igniter;

and the control signal to a variable valve timing mechanism 150 that can change the open/close time of the intake valve 128. The engine ECU 24, which communicates with the HV ECU 70, controls the operation of the engine 22 via the control signal from the HV ECU 70 and, at the same time, outputs data on the operation state of the engine 22 as necessary. The engine ECU 24 calculates the number of rotations of the crank shaft 26, that is, the number of rotations Ne of the engine 22, based on the crank position from the crank position sensor 140. The engine ECU 24 also calculates the air volume load rate (ratio of the air volume actually taken in per cycle of the engine 22 to the air volume that can be taken in per cycle) KL based on the intake air volume Qa from the air flow meter 148 and the number of rotations Ne of the engine 22.

Although not shown, the motor ECU 40 is configured as a microprocessor with the CPU as its main component. In addition to the CPU, the motor ECU 40 includes a ROM that stores processing programs, a RAM that temporarily stores data, an input/output port, and a communication port. The motor ECU 40 receives the signals necessary for driving and controlling the motors MG1 and MG2. For example, via the input port, the motor ECU 40 receives the signals from rotation position detection sensors 43 and 44, which detect the rotation position of the rotor of the motors MG1 and MG2, and the phase currents applied to the motors MG1 and MG2 that are detected by a current sensor not shown. Similarly, via the output port, the motor ECU 40 outputs the switching control signal that causes the switching device, not shown, in the inverters 41 and 42 to switch. In addition, the motor ECU 40, which communicates with the HV ECU 70, drives and controls the motors MG1 and MG2 by the control signal from the HV ECU 70 and, at the same time, outputs data on the operation state of the motors MG1 and MG2 to the HV ECU 70 as necessary. The motor ECU 40 calculates the number of rotations Nm1 and Nm2 of the motors MG1 and MG2 respectively based on the signal from the rotation position detection sensors 43 and 44.

The battery ECU 52 is configured as a microprocessor with the CPU as its main component. In addition to the CPU, the battery ECU 52 includes a ROM that stores processing programs, a RAM that temporarily stores data, an input/output port, and a communication port. The battery ECU 52 receives the signals necessary for managing the battery 50. For example, the battery ECU 52 receives a terminal-to-terminal voltage from a voltage sensor, not shown, installed between the terminals of the battery 50, a charge/discharge current from a current sensor, not shown, installed on the power line connected to the output terminal of the battery 50, and the battery temperature Tb from a temperature sensor 51 installed on the battery 50. The battery ECU 52 sends data on the state of the battery 50 to the HV ECU 70 via communication as necessary. In addition, the battery ECU 52 calculates the state of charge (SOC), which is the ratio of the capacity of electric power chargeable from the battery 50 at a particular point in time to the total capacity, based on the accumulation value of the charge/discharge current detected by the current sensor for managing the battery 50. The battery ECU 52 also calculates the input/output limitations Win and Wout, which mean the maximum permissible power with which the battery 50 can be charged or discharged, based on the calculated state of charge SOC and the battery temperature Tb.

The HV ECU 70 is configured as a microprocessor, not shown, with the CPU as its main component. In addition to the CPU, the HV ECU 70 includes a ROM that stores processing programs, a RAM that temporarily stores data, an input/output port, and a communication port. The HV ECU 70 receives the following signals from the input port. They include the following via the input port: the ignition signal from an ignition switch 80, the shift position SP from a shift position sensor 82 that detects the operation position of a shift lever 81, the accelerator opening Acc from an accelerator pedal position sensor 84 that detects the depression amount of an accelerator pedal 83, the brake pedal position BP from a brake pedal position sensor 86 that detects the depression amount of a brake pedal 85, and the vehicle speed V from a vehicle speed sensor 88. The HV ECU 70, connected to the engine ECU 24, motor ECU 40, and battery ECU 52 via the communication port as described above, sends and receives control signals and data to and from the engine ECU 24, motor ECU 40, and battery ECU 52.

The hybrid car 20 in the exemplary embodiment configured as described above calculates a requested torque Tr* to be output to the driving shaft 36, based on the accelerator opening Acc corresponding to the driver's accelerator pedal depression amount and the vehicle speed V. The hybrid car 20 controls the operation of the engine 22, motor MG1, and motor MG2 so that the requested motive power corresponding to the requested torque Tr* can be output to the driving shaft 36. To control the operation of the engine 22, motor MG1, and motor MG2, there are three operation modes: torque conversion operation mode, charge/discharge operation mode, and motor operation mode. In the torque conversion operation mode, the hybrid car 20 controls the operation of the engine 22 so that the motive power corresponding to the requested motive power is output from the engine 22 and, at the same time, controls the driving of the motor MG1 and the motor MG2 so that all motive power, output from the engine 22, is torque-converted by the planetary gear 30, motor MG1, and motor MG2 and the converted power is output to the driving shaft 36. In the charge/discharge operation mode, the hybrid car 20 controls the operation of the engine 22 so that the motive power, corresponding to the sum of the requested motive power and the electric power required for the charge/discharge of the battery 50, is output from the engine 22 and, at the same time, controls the driving of the motor MG1 and motor MG2 so that the requested motive power is output to the driving shaft 36 when all or a part of the motive power, output from the engine 22 as the battery 50 is charged or discharged, is torque-converted by the planetary gear 30, motor MG1, and motor MG2. In the motor operation mode, the hybrid car 20 stops the operation of the engine 22 and outputs the motive power, corresponding to the requested motive power from the motor MG2, to the driving shaft 36. In both the torque conversion operation mode and the charge/discharge operation mode, the hybrid car 20 controls the engine 22 and motors MG1 and MG2 so that the requested motive power is output to the driving shaft 36 when the engine 22 is operated. Because there is no substantial difference in control between these two modes, they are collectively called the engine operation mode.

When one of the following three cases occurs, the hybrid car 20 in this exemplary embodiment starts the engine 22 to move to the engine operation mode assuming that the start of the engine 22 is requested. In a first case, a driver fully depresses the accelerator pedal 83 (for example, Accelerator opening ACC is fully opened) during driving in the motor driving mode but the requested motive power cannot be satisfied only by the electric power from the battery 50. In a second case, the state of charge SOC of the battery 50 becomes lower than a threshold predetermined for switching the mode to the engine operation mode. In a third case, the vehicle enters the state predetermined for switching the mode to the engine operation mode. On the other hand, when one of the following three cases occurs, the hybrid car 20 in this exemplary embodiment stops the engine 22 to move to the motor operation mode. In a first case, the state of charge SOC of the battery 50 becomes equal to or higher than the threshold during driving in the engine operation mode and the requested-motive power can be satisfied by discharging the battery 50. In a second case, the driver presses the motor traveling switch not shown. In a third case, the vehicle enters the state predetermined for switching the mode to the motor operation mode.

In the engine operation mode, the HV ECU 70 sets the requested torque Tr* to be output to the driving shaft 36 based on the accelerator opening Acc from the accelerator pedal position sensor 84 and the vehicle speed V from the vehicle speed sensor 88 and, then, multiplies the requested torque Tr*, which has been set, by the number of rotations Nr of the driving shaft 36 (for example, the number of rotations obtained by multiplying the number of rotations Nm2 of the motor MG2 or the vehicle speed V by the conversion coefficient) to calculate the traveling power Pdry required for traveling. At the same time, the HV ECU 70 subtracts the charge/discharge request power Pb* (positive value when the battery 50 is discharged) of the battery 50, obtained based on the state of charge SOC of the battery 50, from the calculated traveling power Pdry to set the target power Pe* that is the power to be output from the engine 22. After that, using the operation line (for example, fuel efficiency optimum operation line) that is the relation between the number of rotations Ne of the engine 22 and the torque Te with which the target power Pe* can be output from the engine 22 efficiently, the HV ECU 70 sets the target number of rotations Ne* of the engine 22 and the target torque Te*. Next, the HV ECU 70 sets the torque instruction Tm1* for the motor MG1 and the torque instruction Tm2* for the motor MG2 as follows. To set the torque instruction Tm1* that is the torque to be output from the motor MG1, the HV ECU 70 performs the number-of-rotations feedback control for setting the number of rotations Ne of the engine 22 to the target number of rotations Ne* within the input/output limitations Win and Wout of the battery 50. To set the torque instruction Tm2* for the motor MG2, the HV ECU 70 subtracts the torque, which is applied to the driving shaft 36 via the planetary gear 30 when the motor MG1 is driven by the torque instruction Tm1*, from the requested torque Tr*. The HV ECU 70 sends the target number of rotations Ne* and the target torque Te*, which have been set, to the engine ECU 24, and the torque instructions Tm1* and Tm2* to the motor ECU 40. The engine ECU 24, which receives the target number of rotations Ne* and the target torque Te*, performs the intake air volume control, fuel injection control, and spark control of the engine 22 so that the engine 22 is operated based on the target number of rotations Ne* and the target torque Te*. The motor ECU 40, which receives the torque instructions Tm1* and Tm2*, performs the switching control of the switching device in the inverters 41 and 42 so that the motors MG1 and MG2 are derived by the torque instructions Tm1* and Tm2* respectively.

In the motor operation mode, the HV ECU 70 sets the torque instruction Tm1* of the motor MG1 to the value of 0 and, at the same time, sets the torque instruction Tm2* of the motor MG2 so that the requested torque Tr* is output to the driving shaft 36 within the input/output limitations Win and Wout of the battery 50. The HV ECU 70 sends these instructions to the motor ECU 40. The motor ECU 40, which receives the torque instructions Tm1* and Tm2*, performs the switching control of the switching device in the inverters 41 and 42 so that the motors MG1 and MG2 are driven by the torque instructions Tm1* and Tm2* respectively.

Figure 3:
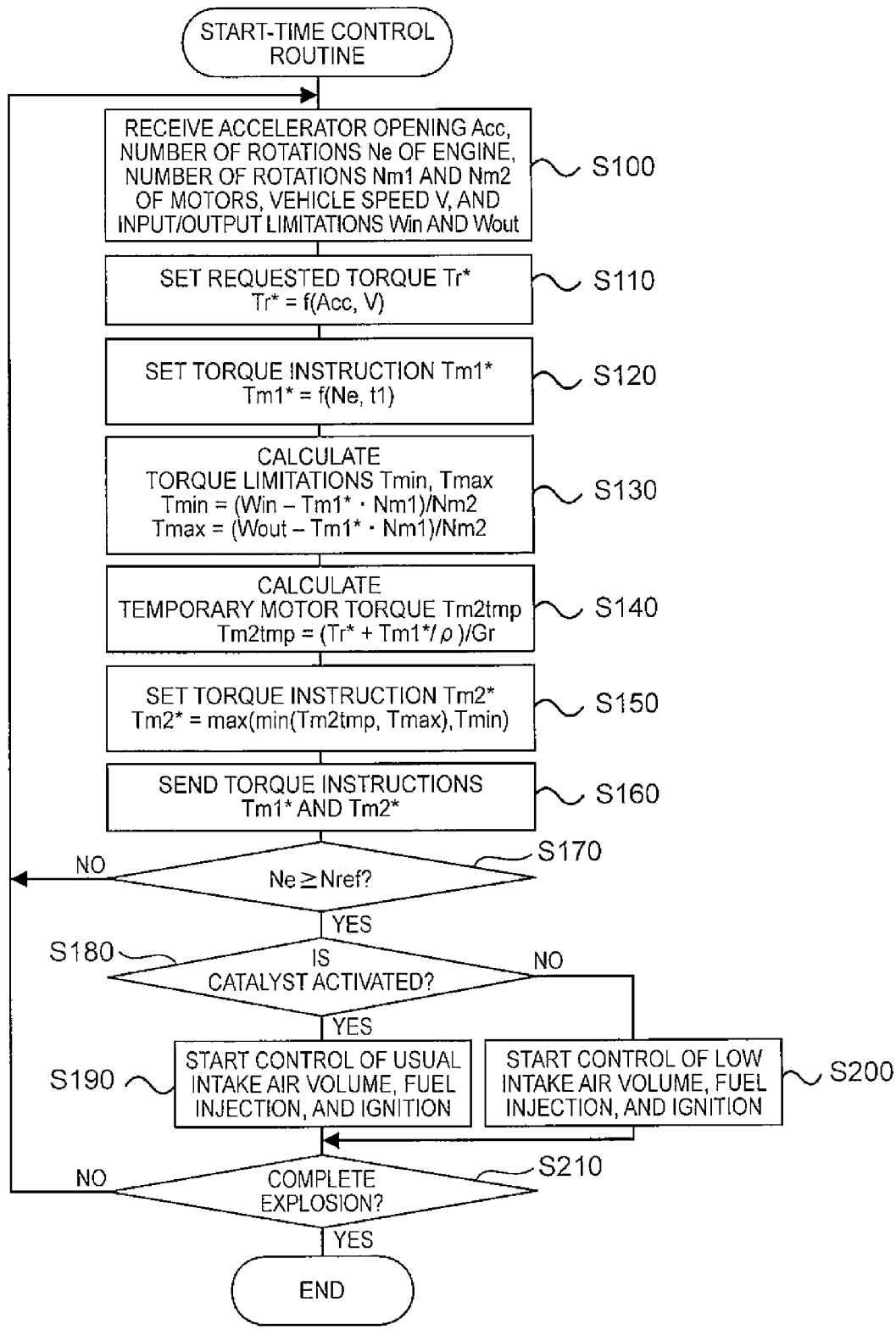
FIG. 3 is a flowchart showing an example of a start-time control routine executed by an HV ECU 70.

Next, the operation of the hybrid car 20 in the exemplary embodiment configured as described above is described below with particular emphasis on the operation that is performed when, after the ignition switch is turned on and while the vehicle is traveling with the operation of the engine 22 stopped, the accelerator pedal 83 is depressed for the first time, the traveling power Pdry exceeds the predetermined power Pth, and the engine 22 is started for the first time. FIG. 3 is a flowchart showing an example of the start-time control routine. This routine is executed when, after the ignition switch is turned on and while the vehicle is traveling with the operation of the engine 22 stopped, the accelerator pedal 83 is depressed, the traveling power Pdry exceeds the predetermined power Pth, and the engine 22 is started for the first time.

Figure 4:
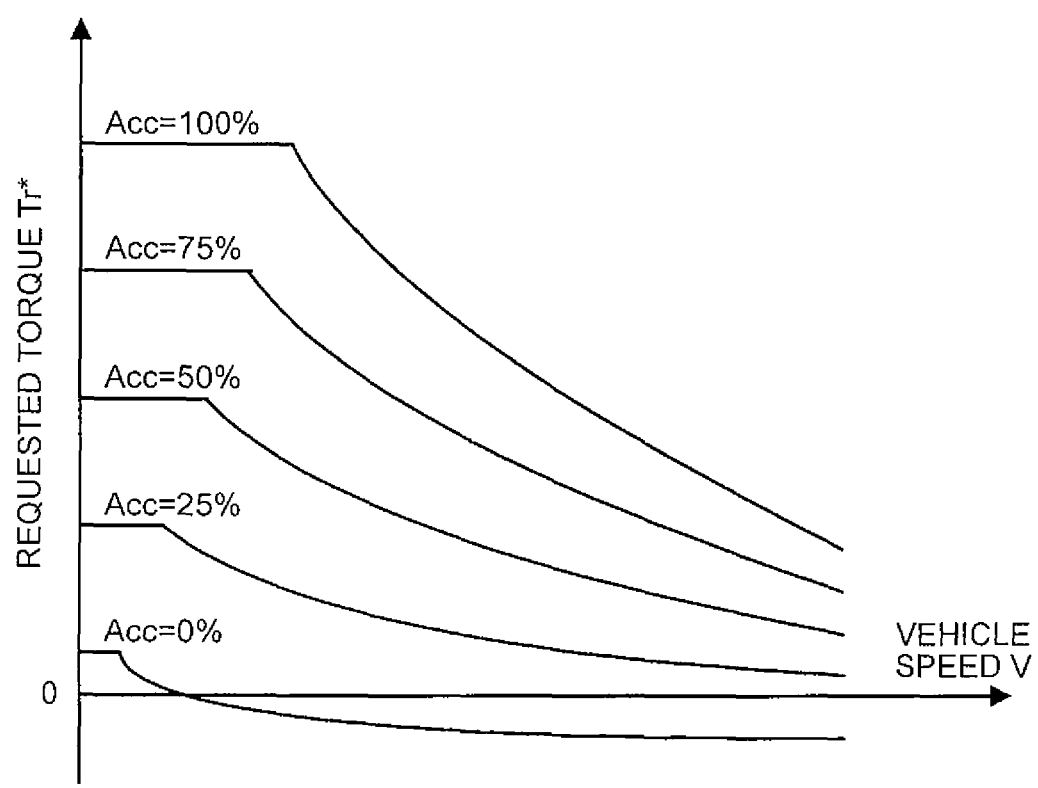
FIG. 4 is a diagram showing an example of a change over time of the torque instruction Tm1* of motor MG1 and the number of rotations Ne of an engine 22 when the operation is started.

When the start-time control routine is started, the CPU of the HV ECU 70 first receives data required for the control operation. The data required for the control operation includes the accelerator opening Acc from the accelerator pedal position sensor 84, vehicle speed V from the vehicle speed sensor 88, number of rotations Nm1 and Nm2 of the motors MG1 and MG2, number of rotations Ne of the engine 22, and input/output limitations Win and Wout of the battery 50 (step S100). The CPU of the HV ECU 70 sets the requested torque Tr* to be output to the driving shaft 36 based on the received accelerator opening Acc and the vehicle speed V (step S110). The number of rotations Ne of the engine 22 is the number of rotations that is calculated based on the signal from the crank position sensor installed on the crank shaft 26 and is received from the engine ECU 24 via communication. The number of rotations Nm1 and Nm2 of the motors MG1 and MG2 are the number of rotations that are calculated based on the rotation positions of the rotors of the motors MG1 and MG2 detected by the rotation position detection sensors 43 and 44 and are received from the motor ECU 40 via communication. The input/output limitations Win and Wout of the battery 50 are the input/output limitations that are set based on the battery temperature of the battery 50, detected by the temperature sensor, and the state of charge SOC of the battery 50 and are received from the battery ECU 52 via communication. In this exemplary embodiment, the requested torque Tr* is stored as a requested torque setting map in the ROM that defines the relation among the accelerator opening Acc, vehicle speed V, and requested torque Tr*. When the accelerator opening Acc and the vehicle speed V are given, the corresponding requested torque Tr* is derived from the stored map and is set. FIG. 4 shows an example of the requested torque setting map.

Figure 5:
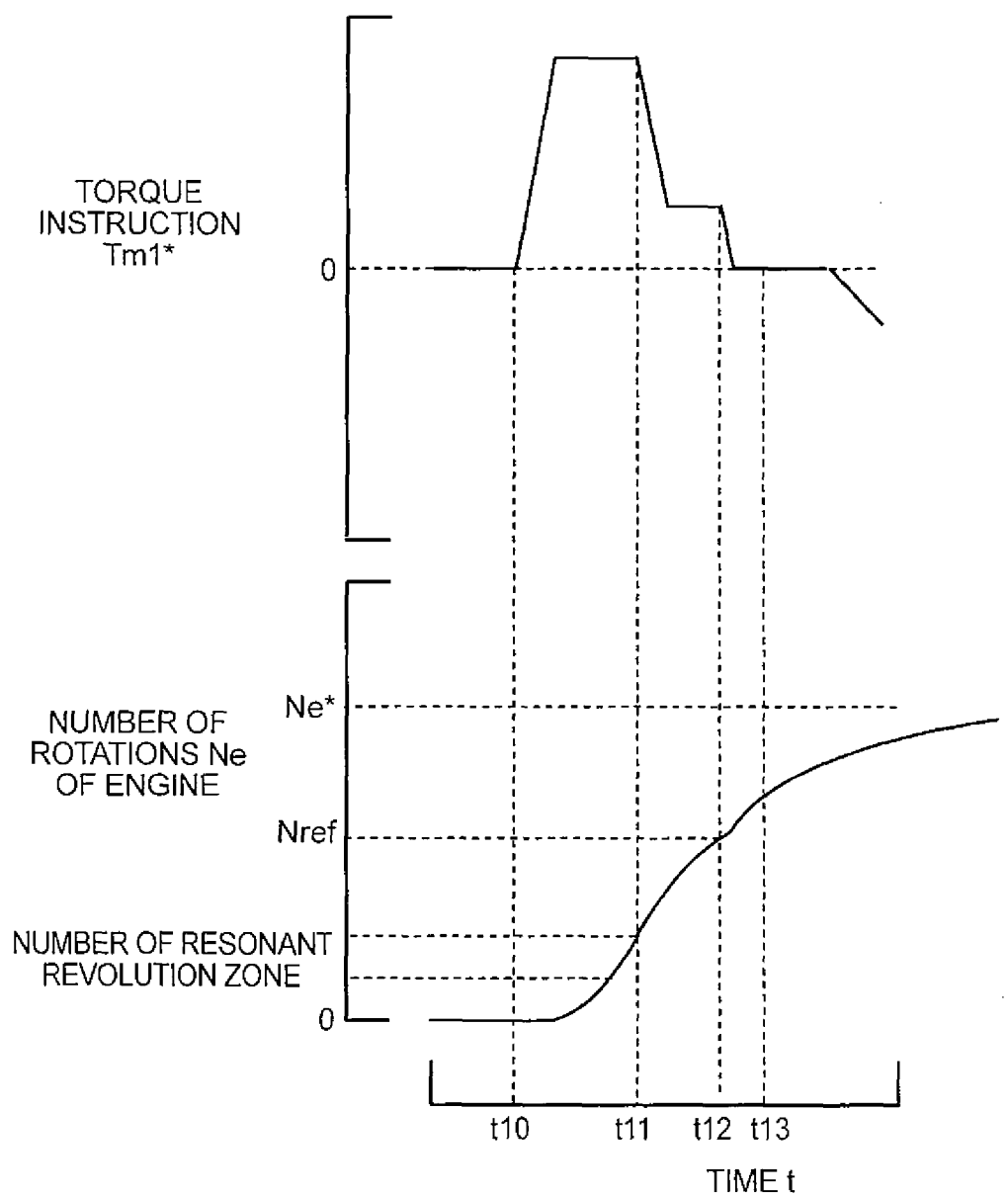
FIG. 5 is a diagram showing an example of the relation among the torque instruction Tm1* of motor MG1, the number of rotations Ne of the engine 22, and an elapsed time t1 when the engine 22 is started.

Next, the CPU of the HV ECU 70 sets the torque instruction Tm1* of the motor MG1 based on the number of rotations Ne of the engine 22 and the elapsed time t1 from the start of the engine 22 (step S120). FIG. 5 shows an example of the relation among the torque instruction Tm1* of the motor MG1, the number of rotations Ne of the engine 22, and the elapsed time t when the engine 22 is started. As shown in the figure, immediately after the time t10 at which the start instruction of the engine 22 is issued, an increasing torque is set for the torque instruction Tm1* using the rate processing in this exemplary embodiment. This quickly increases the number of rotations Ne of the engine 22. After the time t11 at which the number of rotations Ne of the engine 22 passes the number of resonant revolution zone, a torque required for cranking the engine 22 stably at the number of rotations Nref (for example, 1000 rpm or 1200 rpm) or higher is set. From the time t12 at which the number of rotations Ne of the engine 22 has reached the number of rotations Nref, a decreasing torque is set using the rate processing so that the torque quickly decreases to the value of 0 and, to the time t13 at which the complete explosion of the engine 22 is determined, the torque with the value of 0 remains set.

Next, using expression (1) and expression (2) given below, the CPU of the HV ECU 70 divides the deviation between each of the input/output limitations Win and Wout of the battery 50 and the power consumption (generated output) of the motor MG1 by the number of rotations Nm2 of the motor MG2 for calculating the torque limitations Tmin and Tmax as the upper and lower limits of torque that may be output from the motor MG2, wherein the power consumption of the motor MG1 is obtained by multiplying the torque instruction Tm1* of the motor MG1, which has been set, by the current number of rotations Nm1 of the motor MG1 (step S130). Next, the CPU of the HV ECU 70 calculates the temporary motor torque Tm2tmp, which is the torque to be output from the motor MG2, using expression (3) in which the requested torque Tr*, torque instruction Tm1*, and gear ratio ρ of the planetary gear 30 (value obtained by dividing the number of teeth of the sun gear by the number of teeth of the ring gear) are used (step S140). The CPU of the HV ECU 70 sets the value, which is the temporary motor torque Tm2tmp limited by the calculated torque limitations Tmin and Tmax, as the torque instruction Tm2* of the motor MG2 (step S150). Expression (3) given below is a mechanical relational expression for the rotating components of the planetary gear 30. Although not shown, this expression may be derived from the collinear diagram that shows the mechanical relation between the number of rotations of the rotating components of the planetary gear 30 and the torque.

$$Tmin=(Win-Tm1^* \cdot Nm1)/Nm2 \quad (1)$$

$$Tmax=(Wout-Tm1^* \cdot Nm1)/Nm2 \quad (2)$$

$$Tm2tmp=(Tr^*+Tm1^*/\rho)/Gr \quad (3)$$

Next, the HV ECU 70 sends the torque instructions Tm1* and Tm2* of the motors MG1 and MG2, which have been set, to the motor ECU 40 (step S160). The motor ECU 40, which receives the torque instructions Tm1* and Tm2*, performs the switching control of the switching device in the inverters 41 and 42 so that the motor MG1 is driven by the torque instruction Tm1* and the motor MG2 is driven by the torque instruction Tm2*.

Next, the HV ECU 70 determines whether the number of rotations Ne of the engine 22 becomes equal to or higher than the number of rotations Nref predetermined as the number of rotations for starting the operation of the engine 22 (step S170). If the number of rotations Ne of the engine 22 is lower than the number of rotations Nref, the processing returns to the data reception processing in step S100 and repeats the processing in steps S100 to S170 until the number of rotations Ne of the engine 22 becomes equal to or higher than the number of rotations Nref.

If the number of rotations Ne of the engine 22 becomes equal to or higher than the number of rotations Nref (step S170), the HV ECU 70 determines whether the purification catalyst (three-way catalyst) of the purification device 134 is activated (step S180). In step S180, it is determined that the purification catalyst is activated when the temperature of the purification catalyst is equal to or higher than the temperature (for example, 400° C.) at which the activation of the purification catalyst can be determined.

If the purification catalyst is activated (YES in step S180), the HV ECU 70 sends the control signals to the engine ECU 24 to instruct it to start the usual intake air volume control, fuel injection control, and ignition control (step S190). The engine ECU 24, which receives the instruction to start the usual intake air volume control, fuel injection control, and ignition control, performs the control as follows. To perform the intake air volume control, the engine ECU 24 adjusts the position of the throttle valve so that a predetermined volume of intake air is taken in as the intake air volume at engine start time. To perform the fuel injection control, the engine ECU 24 drives the fuel injection valve so that the amount of injection fuel, which is determined by making various corrections to the amount of injection fuel to be injected into the volume of taken-in air, is injected into the combustion chamber with right timing. To perform the ignition control, the engine ECU 24 controls the ignition coil so that the fuel injected into the combustion chamber is ignited by the spark plug with right timing. The control processing performed in this way allows the engine 22 to be started more reliably when the purification catalyst is activated.

If the purification catalyst is not activated (NO in step S180), the HV ECU 70 sends the control signals to the engine ECU 24 to instruct it to start the low intake air volume control that is the control for an air volume lower than the usual air volume, fuel injection control, and ignition control (step S200). The engine ECU 24, which receives the instruction to start the low intake air volume control, fuel injection control, and ignition control, performs the control as follows. To perform the low intake air volume control, the engine ECU 24 adjusts the position of the throttle valve so that a volume of air lower than the volume of air in step S190 (for example, the air volume predetermined as the air volume for the idle operation of the engine 22) is taken in. To perform the fuel injection control, the engine ECU 24 drives the fuel injection valve so that the amount of injection fuel, which is determined by making various corrections to the amount of injection fuel to be injected into the volume of taken-in air, is injected into the combustion chamber with right timing. To perform the ignition control, the engine ECU 24 controls the ignition coil so that the fuel injected into the combustion chamber is ignited by the spark plug with right timing. If the usual intake air volume control is performed as in step S180 when the purification catalyst is not activated, it is possible that the emission will become worse. In such a case, the low intake air volume control, in which the air volume is lower than the usual air volume as in step S200, prevents the emission from becoming worse.

After the usual intake air volume control, fuel injection control, or ignition control is started in the engine 22, the HV ECU 70 determines whether the engine 22 is in the complete explosion state (step S210). If the engine 22 is not in the complete explosion state, the processing returns to step S100 to repeat the processing; if the engine 22 is in the complete explosion state, the routine is terminated. The processing described above allows the operation of the engine 22 to be started while traveling with the power based on the requested torque. If the purification catalyst is activated at this time, the usual intake air volume control allows the engine 22 to be started reliably when the operation of the engine 22 is started.

According to the hybrid car 20 in the exemplary embodiment described above, if the purification catalyst is not activated when, after the ignition switch is turned on and while the vehicle is traveling with the operation of the engine 22 stopped, the accelerator pedal 83 is depressed for the first time to start the engine 22, performing the low intake air volume control, which is the control for an air volume lower than the usual air volume, when the operation of the engine 22 is started prevents the emission from becoming worse.

In the hybrid car 20 in the exemplary embodiment, the low intake air volume control is performed in the processing in step S200 in which the position of the throttle valve is adjusted so that the air volume, predetermined as the air volume for the idle operation of the engine 22, is taken in as an air volume lower than the air volume taken in step S190. Because the low intake air volume control is performed in such a way that the position of the throttle valve is adjusted to take in a volume of air that is lower than the volume of air taken in step S190 and is enough to stall the engine 22, it is also possible to take in a volume of air larger than the air volume required for the idle operation of the engine 22.

In the hybrid car 20 in the exemplary embodiment, the processing in step S180 is performed to determine whether the purification catalyst is activated. Instead of this, it is also possible to skip the processing in steps 180 and 190 but to perform the processing in step S200 to instruct the engine ECU 24 to start the low intake air volume control that is the control for an air volume lower than the usual air volume, fuel injection control, and ignition control when the number of rotations Ne of the engine 22 is equal to or higher than the number of rotations Nref.

Figure 6:
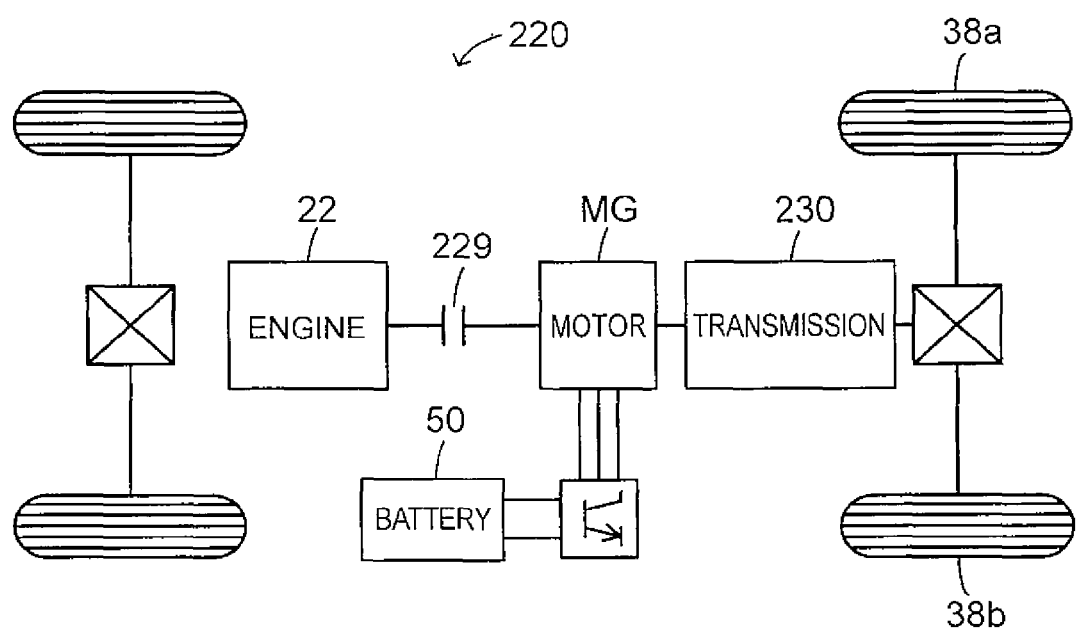
FIG. 6 is a configuration diagram showing the general configuration of a hybrid car 220 in a modification.

In the hybrid car 20 in the exemplary embodiment, the motive power from the engine 22 is output to the driving shaft 36, to which the driving wheels 38a and 38b are connected, via the planetary gear 30 and, at the same time, the motive power from the motor MG2 is output to the driving shaft 36. As exemplified in a hybrid car 220 in an example of a modification in FIG. 6, another configuration is also possible in which a motor MG is installed on the driving shaft 36, to which the driving wheels 38a and 38b are connected, via a transmission 230 and the engine 22 is connected to the rotation axis of the motor MG via a clutch 229. This configuration allows the motive power from the engine 22 to be output to the driving shaft 36 via the rotation axis of the motor MG and the transmission 230 and, at the same time, the motive power from the motor MG to be output to the driving shaft via the transmission 230.

The correspondence between the main components in the exemplary embodiment and the main components of the invention described in SUMMARY OF THE INVENTION is described below. In the exemplary embodiment, the engine 22 may be regarded as the "internal combustion engine", the motor MG2 as the electric motor, the battery 50 as the "battery", and the hybrid car 20 as the "hybrid vehicle". In the exemplary embodiment, the HV ECU 70, motor ECU 40, and engine ECU 24 may be regarded as the "electronic control unit". The HV ECU 70 executes the start-time control routine shown in FIG. 3. The motor ECU 40 receives the torque instruction Tm2* from the HV ECU 70 to drive and control the motor MG2. The engine ECU 24 receives control signals from the HV ECU 70 to perform the intake air volume control, fuel injection control, ignition control, and intake air valve timing control of the engine 22.

Because the correspondence between the main components in the exemplary embodiment and the main component of the invention described in SUMMARY OF THE INVENTION is a specific example of the mode for carrying out the invention described in SUMMARY OF THE INVENTION, the components of the invention are not limited to those described in SUMMARY OF THE INVENTION. That is, it should be noted that the invention described in SUMMARY OF THE INVENTION should be interpreted based on the description therein and that the exemplary embodiment is simply an example of the invention described in SUMMARY OF THE INVENTION.

Although exemplary embodiments for carrying out the present invention have been described above, it is to be understood that the present invention is not limited to the exemplary embodiments described above but various modifications are possible without departing the spirit of the present invention.

The present invention is applicable to the manufacturing industry of a hybrid vehicle control device and a hybrid vehicle.

What is claimed is:

1. A control device for controlling a hybrid vehicle including
an internal combustion engine of which a purification device having a purification catalyst for purifying an exhaust is installed in an exhaust system and which outputs a motive power for traveling; an electric motor that receives and outputs a motive power for traveling; and a battery that sends and receives an electric power to and from the electric motor,
the control device comprising:
a electronic control unit configured to control the internal combustion engine and the electric motor such that, when receiving a power request while traveling with an operation of the internal combustion engine stopped and a requested power required for traveling is higher than a predetermined power, the operation of the internal combustion engine is started with an intake air volume based on the requested power and the hybrid vehicle travels with the requested power,
the electronic control unit being configured to perform a start control for controlling the internal combustion engine such that, when receiving the power request for the first time after an ignition switch is turned on, the operation of the internal combustion engine is started with an intake air volume lower than the intake air volume based on the requested power.

2. The control device according to claim 1 wherein
the electronic control unit is configured to perform the start control when receiving the power request for the first time after the ignition switch is turned on and the purification catalyst is not activated.

3. The control device according to claim 2 wherein
the electronic control unit is configured to determine that the purification catalyst is not activated when a temperature of the purification catalyst is lower than a predetermined temperature.

4. The control device according to claim 1 wherein
the electronic control unit is configured to control the internal combustion engine such that, in the start control, the internal combustion engine is started with an intake air volume predetermined for an idle operation of the internal combustion engine.

5. A hybrid vehicle comprising:
an internal combustion engine configured to output a motive power for traveling;
a first electric motor configured to receive and output a motive power for traveling;
a battery configured to send and receive an electric power to and from the first electric motor;
a purification device that has a purification catalyst for purifying an exhaust and is installed in an exhaust system of the internal combustion engine; and
a electronic control unit configured to control the internal combustion engine and the first electric motor such that, when receiving a power request while traveling with an operation of the internal combustion engine stopped and a requested power required for traveling is higher than a predetermined power, the operation of the internal combustion engine is started with an intake air volume based on the requested power and the hybrid vehicle travels with the requested power, the electronic control unit being configured to perform a start control for controlling the internal combustion engine such that, when receiving the power request for the first time after an ignition switch is turned on, the operation of the internal combustion engine is started with an intake air volume lower than the intake air volume based on the requested power.

6. The hybrid vehicle according to claim 5, further comprising:
   a planetary gear including three rotating components, the three rotating components being connected respectively to a driving shaft linked to an axle, an output axis of the internal combustion engine, and a rotation axis of the first electric motor; and
   a second electric motor including a rotation axis, the rotation axis of the second electric motor being connected to the driving shaft.

* * * * *